United States Patent [19]
Goff et al.

[11] Patent Number: 5,370,332
[45] Date of Patent: Dec. 6, 1994

[54] VIDEOCASSETTE FLANGE WITH TIME AVAILABLE GAUGE

[75] Inventors: Dewain R. Goff, Newport; Kim R. Olson, Woodbury; John T. Gianfagna, Minneapolis, all of Minn.

[73] Assignee: Minnesota Mining and Manufacturing Company, St. Paul, Minn.

[21] Appl. No.: 154,637

[22] Filed: Nov. 18, 1993

Related U.S. Application Data

[63] Continuation of Ser. No. 877,486, May 1, 1992, abandoned.

[51] Int. Cl.⁵ .................................... B65H 75/18
[52] U.S. Cl. ........................ 242/344; 242/608.8; 242/912
[58] Field of Search ............... 242/57, 71.8, 118.4, 242/197, 199

[56] References Cited

U.S. PATENT DOCUMENTS

| | | | |
|---|---|---|---|
| 2,476,928 | 7/1949 | Thomas | 242/71.8 |
| 2,937,818 | 5/1960 | Zorn | 242/71.8 |
| 3,726,489 | 4/1973 | Honsa | 242/71.8 |
| 4,501,396 | 2/1985 | Tomsyck et al. | 242/199 |
| 4,560,117 | 12/1985 | Shimizu | 242/71.8 |
| 4,564,156 | 1/1986 | Cybulski | 242/71.8 X |
| 4,717,091 | 1/1988 | Schoettle et al. | 242/199 |
| 4,846,419 | 7/1989 | Tateno et al. | 242/71.8 |
| 4,880,180 | 11/1989 | Adair | 242/71.8 |
| 4,993,661 | 2/1991 | Tollefson | 242/188 |
| 5,007,596 | 4/1991 | Iwahahi | 242/71.8 |
| 5,127,597 | 7/1992 | An | 242/71.8 |
| 5,167,378 | 12/1992 | Johanson | 242/71.8 |

FOREIGN PATENT DOCUMENTS

| | | | |
|---|---|---|---|
| 886490 | 10/1943 | France | 242/71.8 |
| 1324300 | 3/1963 | France | 242/71.8 |
| 1333915 | 6/1963 | France | 242/71.8 |
| 971317 | 9/1964 | United Kingdom | 242/71.8 |

*Primary Examiner*—Daniel P. Stodola
*Assistant Examiner*—Eileen A. Dunn
*Attorney, Agent, or Firm*—Gary L. Griswold; Walter N. Kirn; Charles D. Levine

[57] ABSTRACT

A reel flange for a magnetic tape cassette reel has apertures for viewing the tape on the reel. The apertures provide a system for visually estimating the quantity of tape contained on the reel. The flange provides the combined advantages of greater choice of materials for making the flange and improved accuracy in estimating the quantity of tape contained on the reel.

23 Claims, 3 Drawing Sheets

VIDEOCASSETTE FLANGE WITH TIME AVAILABLE GAUGE

This is a continuation of application Ser. No. 07/877,486 filed May 1, 1992, now abandoned.

TECHNICAL FIELD

The present invention relates to videocassette reel flanges. More particularly, the present invention relates to videocassette reel flanges that can aid in estimating the available time for recording on the tape.

BACKGROUND OF INVENTION

Cassettes for holding magnetic recording tape are well known. Typically, such cassettes include a shell which encloses a supply reel of magnetic recording tape and a take-up reel. The free end of the tape on the supply reel is attached to a length of nonmagnetic, usually transparent leader tape, which is threaded over a series of tape guides and is attached to the hub of the take-up reel without additional threading or attachment steps. Recording onto the tape involves inserting the cassette into a recording or playing apparatus which passes the tape over a magnetic head while winding it from the supply reel to the take-up reel. After rewinding the recorded tape onto the supply reel, the recorded material can be played back by following steps similar to the recording steps.

Since cassettes typically contain sufficient tape for more than one recording, it is desirable for a user to know the relative amounts of tape on the supply reel and on the take-up reel. The user might wish to estimate whether sufficient blank tape is present on the supply reel to make a recording of a given length. A known method of estimating the available recording time is to estimate the length of tape on the supply reel by measuring the diameter of the roll of tape on the reel. Based upon the length of the tape on the roll, and the speed at which the recording apparatus transports the tape past the recording head, the available recording time can be calculated.

Measuring tape roll diameter requires using windows and transparent flanges on the tape reels for viewing the tape. Since the user must look through two layers of transparent material, it is important that both sides of both the window and the transparent flange be clean and free of scratches or other defects. Of the four surfaces involved, only the outside of the cassette window is accessible for cleaning.

While suitable transparent polymeric thermoplastic materials are available for producing cassette windows and flanges, these materials suffer from certain disadvantages. These materials tend to be higher in cost and less durable than opaque materials. Furthermore, the number of additives available for improving mechanical properties of transparent thermoplastics is limited by the need to maintain transparency. For example, transparent styrene and styrene-acrylonitrile (SAN) are brittle and easily cracked during assembly and use. Additives used to increase impact strength tend to degrade the transparency of the material to an unacceptable level. Another problem which arises in the molding of transparent parts from thermoplastics is that the flow of the material being molded often leads to variations in optical properties, called flow lines, which produce distortion and detract from the usefulness and appearance of the product.

Known methods for providing more precise estimates of the amount of tape contained on a reel include measuring scales. One scale is disclosed in U.S. Pat. No. 4,501,396, and is attached to a videocassette window. Other tape cassettes provide scale markings molded into the window itself for this purpose. One difficulty with these scales is that they are located a distance from the tape, so that changes in the direction of viewing of the tape can cause significant error, due to parallax, in measuring tape roll diameter.

U.S. Pat. No. 4,846,419 discloses a measuring scale molded directly into the reel flange, to place the scale nearer to the tape, thereby reducing, although not eliminating, error due to parallax. Measuring scales molded into plastic surfaces suffer from an additional problem. Molding imperfections in the region surrounding the scale markings are common, and these imperfections can cause optical distortion which makes reading of the scale difficult and introduces measurement error.

A further disadvantage of transparent tape reels is that the choice of flange color is severely limited. In selling products into a competitive market, the use of attractive colors is an important device for increasing customer appeal.

There is a need for a cassette reel flange having improved mechanical properties, particularly improved impact strength, while still permitting the user to visually estimate the amount of tape contained on the reel. There is also a need for an easily-read tape roll measurement scale which has greatly reduced parallax and optical distortion, to provide greater accuracy in estimating tape length, and which can be transparent, translucent, or opaque.

SUMMARY OF THE INVENTION

A cassette according to the invention has a supply reel and a take-up reel. The supply reel has a lower flange, a hub, and an upper flange. The upper flange has a time left gauge for estimating the quantity of tape on the tape reel and the time available for recording. The gauge is a system which includes at least one aperture formed on the upper flange and located at a predetermined location. A radially inner edge of the aperture represents a first quantity of tape and a radially outer edge of the aperture represents a second quantity of tape.

In a preferred embodiment, the flange can be made of an opaque, thermoplastic material and includes a plurality of apertures. The flange could include a central disk, an outer ring, and three spokes emanating from the central disk and extending to the outer ring, with apertures located on each spoke. Markings can be placed at radial locations along at least one radial edge of at least one of the apertures.

When the cassette is a VHS videocassette, radially inner and radially outer edges of respective apertures correspond to fifteen minutes, thirty minutes, forty-five minutes, and one hundred five minutes of available recording time when the tape is recorded at a speed of 33.35 mm/s.

DETAILED DESCRIPTION OF PREFERRED EMBODIMENTS

Figure 1:
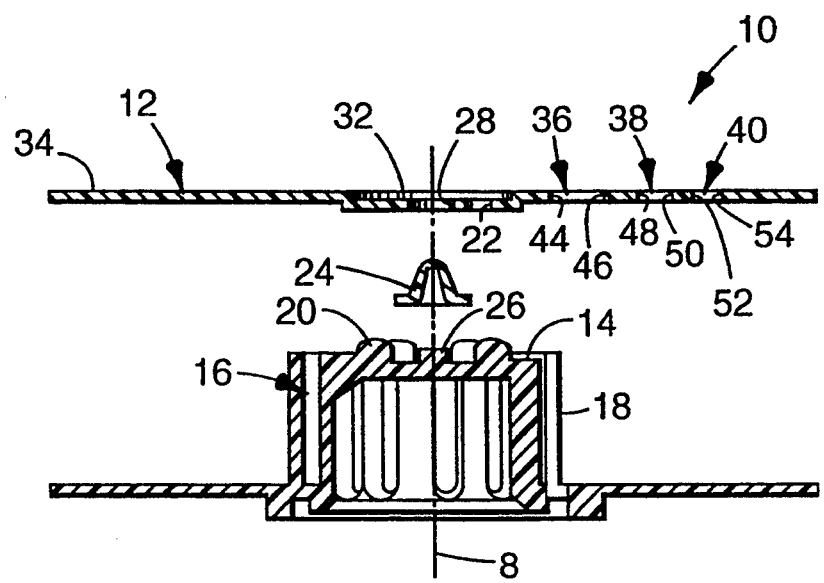
FIG. 1 is an exploded central crosssectional view of a reel according to the present invention.

FIG. 1 shows a tape lower reel flange and an upper reel 10 having a reel flange 12 which fits onto the top surface 14 of the reel hub 16. The flange 12 is centered and held in place by studs 20, which fit through holes 22 in the flange 12. A wear button 24, which fits over a stud 26, passes through a hole 28 in the flange 12, to provide a bearing surface for a leaf spring (not shown) which holds the reel 10 on a drive spindle (not shown) during use. A tape reel of the type shown in FIG. 1 is disclosed in U.S. Pat. No. 4,564,156, assigned to Minnesota Mining and Manufacturing Company.

Figure 2:
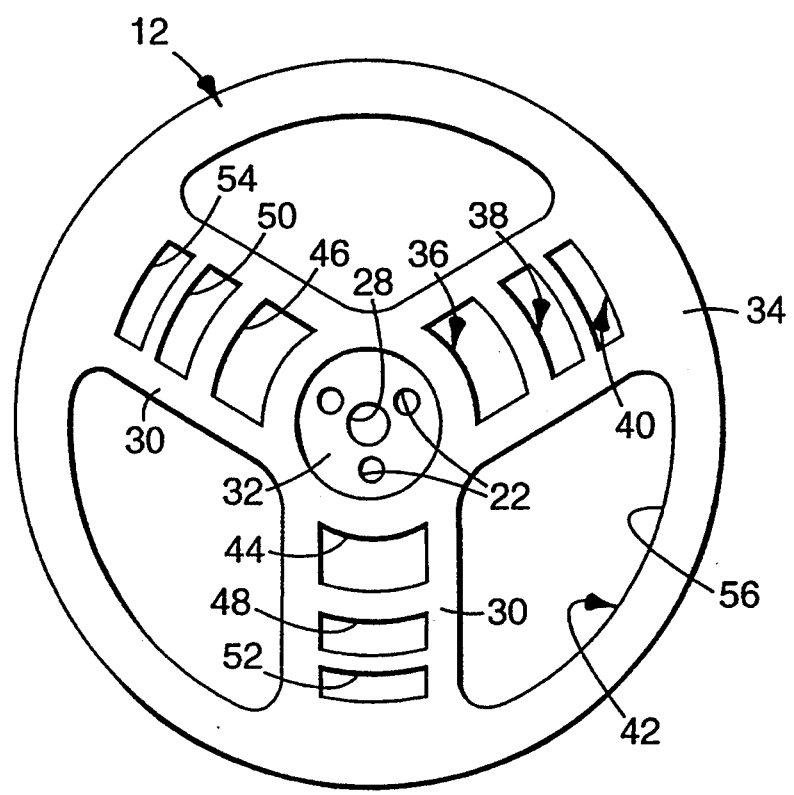
FIG. 2 is a top view of the reel flange of FIG. 1.

Referring to FIG. 2, spokes 30 radiate outwardly from a central disk 32 of the reel flange 12, and combine with an outer ring 34 to form a disk surface having multiple apertures 36, 38, 40, and 42. Aperture edges 44, 46, 48, 50, 52, and 54 are spaced at distances from the hub surface 18 which represent regular length intervals of tape wound onto reel 10.

In the embodiment shown, the aperture edge 44 is a segment of a circle concentric with center axis 8 and is coincident with the hub surface 18, so that it represents zero tape wound onto the reel 10. In the case of a standard VHS tape reel, as specified in Publication 774 of the International Electrotechnical Commission, Appendix A, the aperture edge 44 would be at a radius of 13 millimeters from the center axis 8.

A convenient radius for the aperture edge 46 in this embodiment is that representing 15 minutes of recording time, at the standard transport speed s of 33.35 millimeters per second in the standard play (SP) mode. The radius at which aperture edge 46 is located can be readily calculated by recognizing that the area of the annular end surface of a roll of tape having an outer radius R and an inner radius r, wherein r is the hub radius, is equal to the length L of the tape wound on the roll times the thickness t of the tape. The area Lt of one edge of a length L of tape having thickness t is the same, whether the tape is laid out flat or rolled up, and is represented by $$\pi(R^2 - r^2) = Lt \quad (1)$$

If s is the transport speed of the tape as it is unwound from the roll, and T is the time of transport, then $L = sT$, and $$\pi(R^2 - r^2) = sTt, \quad (2)$$

and $$R = [sTt/\pi + r^2]^{\frac{1}{2}} \quad (3)$$

For the VHS format, according to IEC-774, in the SP mode, s=33.35 mm/second, t=0.021 millimeters, and r=13 mm. Substitution of these values into equation 2, for a recording time of T=15 minutes=900 seconds, R=19.2 mm. Therefore, the radial distance between edges 44 and 46 is 19.2 mm−13.0 mm=6.2 mm.

Similarly, by locating the edge 48 of the aperture 38 at a radius representing 30 minutes of recording time, the radial distance between the edges 46 and 48 is made to represent another 15 minute time interval. Additional 15 minute intervals can be constructed according to equation 3, as shown in Table I.

TABLE I

| Edge | Tape Remaining on Roll (Minutes) | Radius (mm) |
|---|---|---|
| 44 | 0 | 13.0 |
| 46 | 15 | 19.2 |
| 48 | 30 | 23.9 |
| 50 | 45 | 27.8 |
| 52 | 60 | 31.2 |
| 54 | 75 | 34.2 |

In a similar manner, an aperture edge 56 can be used as an indicator of tape length. It has been found that a convenient choice for the radius of the aperture edge 56 is to have it represent 105 minutes of available playing time, of the total of 120 minutes available in the SP mode, in which case the radius of the edge 56 is calculated to be 39.7 mm, as measured from the center axis 8.

At slower tape speeds, LP and EP, two and three times slower than SP, the edges would represent two and three times, respectively, more available playing time. The choice of time intervals need not be those chosen above, but can be any intervals deemed convenient to the user. Also, the specific radii at which the edges of the apertures 36, 38, 40, and 42 are located could be found experimentally by winding tape onto the reel at a standard speed for a measured length of time, and measuring the radius of the resulting roll of tape.

Figure 3:
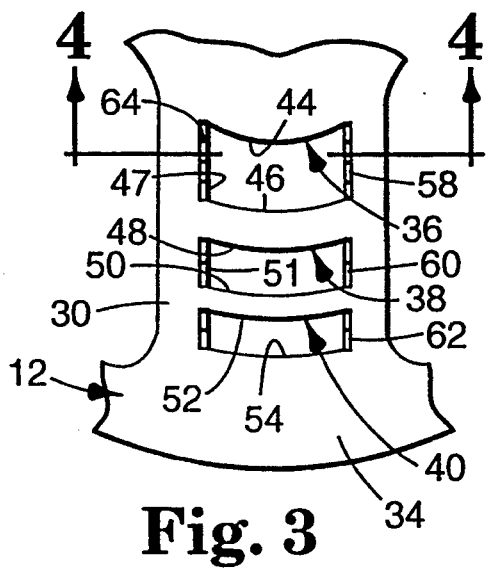
FIG. 3 is an enlarged view of FIG. 2.
Figure 4:
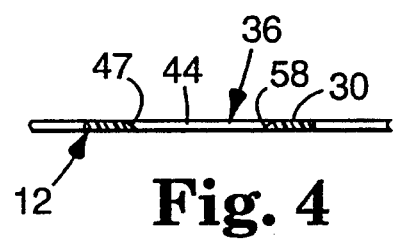
FIG. 4 is a cross-sectional view of the reel flange taken along line 4—4 of FIG. 3.

In addition to the recording or playing time intervals indicated by the edges 44, 46, 48, 50, 52, 54, and 56, smaller time intervals can be indicated by intermediate markings as shown in FIG. 3. In one alternative embodiment, beveled areas 58, 60, and 62 are provided adjacent to the apertures 36, 38, and 40. Markings 64 are incorporated into these beveled areas at intervals representing convenient recording or playing times. Beveling of the areas 58, 60, and 62, as shown in FIG. 4, places markings 64 nearer to the tape roll, thereby enabling a more accurate measurement to be made.

Figure 5:
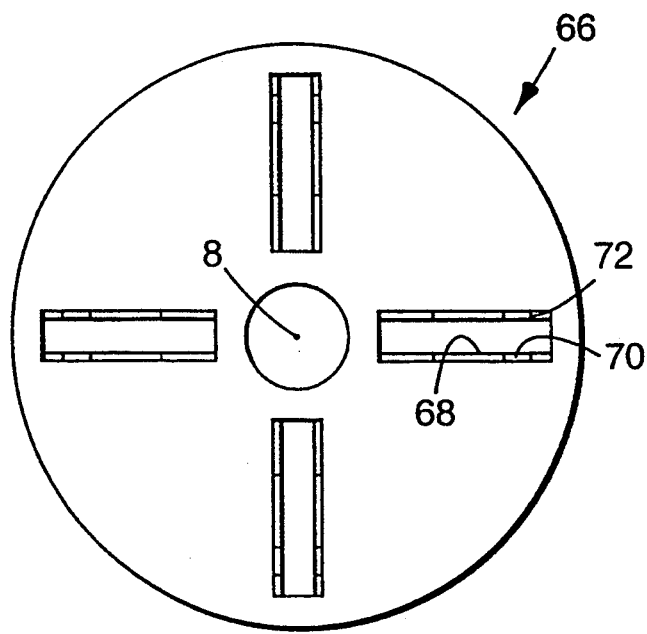
FIG. 5 is a top view of a reel flange according to another embodiment of the present invention.

Another embodiment is shown in FIG. 5, in which the flange 66 is a flat disk containing a plurality of apertures 68, through which the roll of tape can be observed. Beveled areas 70 placed along the radial edges of at least one aperture 68 have markings 72, which indicate the radius of the roll of tape, and therefore the amount of tape present. Any convenient number of apertures 68 can be provided in flange 66, and this number is not limited to the four shown in FIG. 5. A larger number would make tape length estimation less sensitive to the rotational position of the reel.

Suitable materials for the flanges 12, 66 include thermoplastics such as acrylics, polypropylene, acrylonitrile-butadiene-styrene (ABS), polystyrene, styrene-acrylonitrile (SAN), and nylon, as well as other commonly used thermoplastics. The flange material can be transparent, translucent, or opaque. Fabrication of the flange can be done by injection molding. Alternatively, since the flanges 12, 66 need not be transparent, they could be made from metal.

Additionally, it is helpful to incorporate numbers or other indicia into the flange 12 at appropriate locations to indicate to the user the meaning of the various apertures and other markings. Such indicia are preferably expressed in terms of recording or playing time.

Figure 6:
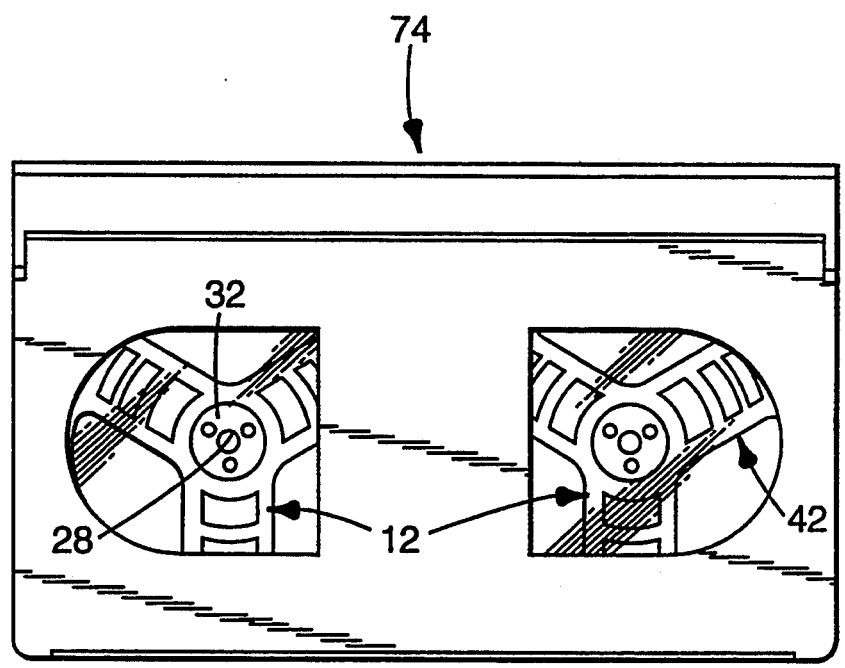
FIG. 6 is a top view of a cassette according to the present invention.

FIG. 6 shows a cassette 74 incorporating a reel 10 with a flange 12 according to the present invention.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be affected therein by one skilled in the art without departing from the scope or spirit of the invention. For example, if the videocassette cover windows are sufficiently large, the various apertures could be staggered on different spokes on different radial lines. The aperture 36 could be on one spoke while apertures 38, 40 are on other spokes.

We claim:

1. A flange for a tape reel comprising at least one aperture formed on the flange and located at a predetermined location with a radially inner edge of the aperture representing a first predetermined quantity of tape and a radially outer edge of the aperture representing a second predetermined quantity of tape, wherein the edges of the aperture indicate the quantity of tape on the tape reel and the time available for recording, and wherein at least one of the first and second predetermined quantities of tape is more than none of the tape and less than all of the tape.

2. The flange of claim 1 wherein the flange is made of an opaque material.

3. The flange of claim 1 wherein the flange is made of a thermoplastic material.

4. The flange of claim 1 further comprising markings placed at radial locations along at least one radial edge of at least one of the apertures to represent quantities of tape greater than the first predetermined quantity and less than the second predetermined quantity.

5. The flange of claim 1 wherein the inner edge represents the first predetermined quantity of tape that indicates that some tape remains and the outer edge represents the second predetermined quantity of tape that indicates that less than all of the tape remains.

6. The flange of claim 1 comprising a plurality of radially spaced apertures.

7. The flange of claim 6 wherein the flange is a VHS videocassette reel flange.

8. The flange of claim 7 wherein each aperture has a radially inner edge and a radially outer edge and wherein respective edges correspond to fifteen minutes, thirty minutes, forty-five minutes, and one hundred five minutes of available recording time when the tape is recorded at a speed of 33.35 mm/s.

9. The flange of claim 1 further comprising a central disk, an outer ring, and a plurality of spokes emanating from the central disk and extending to the outer ring, wherein the aperture is located on one spoke.

10. The flange of claim 9 comprising a plurality radially spaced of apertures located on at least one spoke.

11. The flange of claim 10 wherein a plurality of apertures is located on each spoke.

12. The flange of claim 11 wherein the flange comprises three spokes.

13. The flange of claim 1 wherein the radially inner and outer edges of the aperture are segments of concentric circles.

14. The flange of claim 13 wherein the radially inner and outer edges of the aperture have the concave side facing toward the center of the reel.

15. A reel comprising a lower flange, a hub, and an upper flange, wherein the upper flange comprises at least one aperture formed on the flange and located at a predetermined location with a radially inner edge of the aperture representing a first predetermined quantity of tape and a radially outer edge of the aperture representing a second predetermined quantity of tape, wherein the edges of the aperture indicate the quantity of tape on the tape reel and the time available for recording, and wherein at least one of the first and second predetermined quantities of tape is more than none of the tape and less than all of the tape.

16. The reel of claim 15 wherein the upper flange comprises a plurality radially spaced of apertures.

17. The reel of claim 15 wherein the inner edge represents the first predetermined quantity of tape that indicates that some tape remains and the outer edge represents the second predetermined quantity of tape that indicates that less than all of the tape remains.

18. A cassette having a supply reel and a take-up reel, wherein the supply reel comprises a lower flange, a hub, and an upper flange, wherein the upper flange comprises at least one aperture formed on the flange and located at a predetermined location with a radially inner edge of the aperture representing a first predetermined quantity of tape and a radially outer edge of the aperture representing a second predetermined quantity of tape, wherein the edges of the aperture indicate the quantity of tape on the tape reel and the time available for recording, and wherein at least one of the first and second predetermined quantities of tape is more than none of the tape and less than all of the tape.

19. The cassette of claim 18 wherein the upper flange comprises a plurality radially spaced of apertures.

20. The cassette of claim 18 wherein the inner edge represents the first predetermined quantity of tape that indicates that some tape remains and the outer edge represents the second predetermined quantity of tape that indicates that less than all of the tape remains.

21. A flange for a tape reel comprising at least one aperture formed on the flange and located at a predetermined location with a radially inner edge of the aperture representing a first predetermined quantity of tape and a radially outer edge of the aperture representing a second predetermined quantity of tape and wherein the difference between the first predetermined quantity of tape and the second predetermined quantity of tape represents a maximum of sixty minutes of available recording time in the VHS SP mode when the recording speed is 33.35 mm/sec.

22. The flange of claim 21 wherein the difference between the first predetermined quantity of tape and the second predetermined quantity of tape represents a maximum of thirty minutes of available recording time in the VHS SP mode when the recording speed is 33.35 mm/sec.

23. The flange of claim 21 wherein the difference between the first predetermined quantity of tape and the second predetermined quantity of tape represents a maximum of fifteen minutes of available recording time in the VHS SP mode when the recording speed is 33.35 mm/sec.

* * * * *